United States Patent Office 3,459,161
Patented Aug. 5, 1969

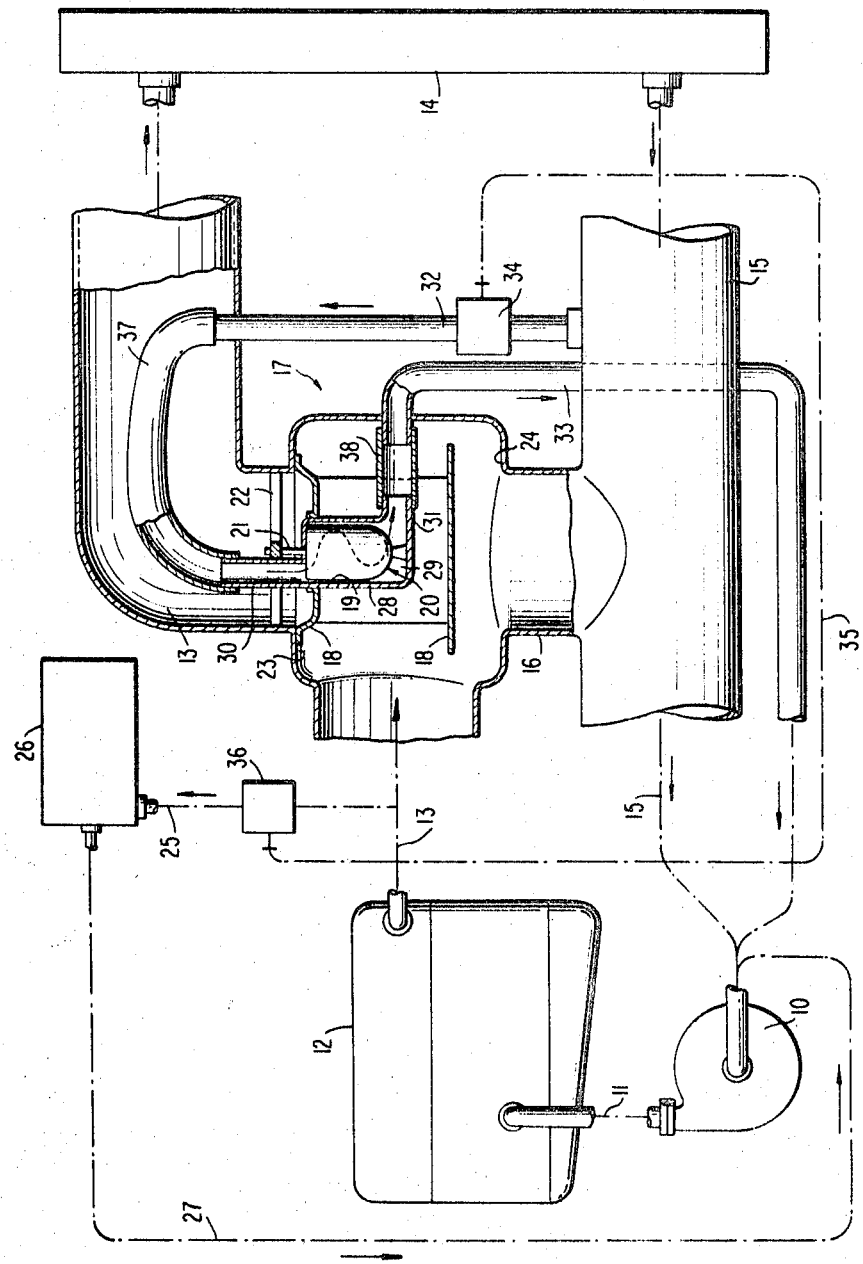

3,459,161
INSTALLATION FOR CONTROLLING THE COOLING MEDIUM TEMPERATURE TO A PREDETERMINED DESIRED VALUE WITH AN INTERNAL COMBUSTION ENGINE
Erwin Kölle, Sindelfingen, Germany, assignor to Daimler-Benz Aktiengesellschaft, Stuttgart Unterturkheim, Germany
Filed Nov. 30, 1967, Ser. No. 686,980
Claims priority, application Germany, Dec. 3, 1966, D 51,703
Int. Cl. F01p 7/16
U.S. Cl. 123—41.1     25 Claims

ABSTRACT OF THE DISCLOSURE

A control installation for controlling the cooling medium temperature to a predetermined desired value in an internal combustion engine in which the heated cooling medium is automatically controlled by a valve controlling the flow through a by-pass line below the opening temperature of the valve and through a heat-exchanger above the opening temperature of the valve, and in which the valve is additionally subjected to a control effect by a heat carrier reflecting the need for an increased output by the heater device and directly acting on the temperature-sensing part of the valve to change the desired value.

Background of the invention

The present invention relates to an installation for controlling the cooling medium temperature to a predetermined, desired value in an internal combustion engine, whose cooling medium circulation system includes a by-pass line by-passing the heat-exchanger for the heat transfer of the cooling medium and is connected to the circulation system for the heat carrier of a heater installation, with a valve being provided for controlling the passage through the heat-exchanger and the associated by-pass line whose movable valve body is operatively connected with an adjusting motor, at which an adjusting force becomes effective in dependence on a sensing element for the cooling medium temperature so that with a cooling medium temperature above the opening temperature of the valve, the by-pass line is closed and the passage through the associated heat-exchanger is opened up whereas with a cooling medium temperature below the opening temperature, the by-pass line is opened and the passage through the associated heat-exchanger is opened up whereas with a cooling medium temperature below the opening temperature, the by-pass line is opened and the passage through the associated heat-exchanger is blocked.

Summary of the invention

The aim underlying the present invention essentially consists in so influencing the sensing device for the cooling medium temperature that with an always constant opening temperature of the valve, different selected cooling medium temperatures can be adjusted under certain conditions.

In differentiation over the prior art, provision is made according to the present invention for this purpose that the sensing element, in addition to being in heat-transferring connection with a space for the cooling medium, is in heat transferring connection with an additional space for a heat carrier for the purpose of changing the desired value of the cooling medium temperature. The intended or desired value for the cooling medium temperature can be either raised or lowered depending on the temperature of the heat carrier introduced into the additional space for the sensing element. It suffices thereby to use already a small quantity of a heat carrier, advantageously selected at will, because this heat carrier is brought into effect with the sensing element directly and not as addition in the cooling medium.

The flow of the heat carrier for the purpose of changing the desired value can be controlled by conventional means—for example, in dependence on the external or atmospheric temperature. If the desired value of the cooling medium temperature is to be raised with lower external temperatures for the purpose of improving the heat output, it may be of advantage that the heat carrier provided therefor has at all times the prevailing external temperature. It is assured thereby that the increase of the desired value takes place only at lower external temperatures and a harmful overheating of the internal combustion engine is avoided. For the same purpose, the control means for the heat carrier may also be coupled with the valve for the heating medium for the purpose of changing the desired value. The cooling medium or heating medium or air may be used again as heat carrier or also another substance or medium, not serving the purpose of heat-exchange of the cooling and heating system, may be used as heat carrier.

A known installation of the type, with which the present invention is concerned, is provided with a valve which includes an axially movable valve disk. The valve disk rests under the influence of a spring on the valve seat of a seating part. An adjusting cylinder, whose housing as sensing element for the cooling medium temperature, is arranged in a space traversed by the cooling medium, serves for the control or adjusting movements of the valve disk. The housing of the adjusting cylinder is filled with the material of high thermal expansivity and is traversed by a pin actuated in a piston-like manner by this material. The housing may be secured at the end, at which the pin leaves the same, in the seating part and the pin may be secured at the valve disk—or vice versa. Such known installations can be further developed according to the present invention in that the housing of the adjusting cylinder is surrounded by a casing or jacket of heat-conducting material and the additional space formed thereby between housing and jacket is sealed with respect to the cooling medium space. The casing or jacket may be provided with suitable connections for the supply and discharge of the heating carrier for the purpose of changing the desired value. If the housing of the adjusting cylinder is connected with the valve disk, the connections of the casing or jacket may be connected appropriately with movable lines for the heat carrier.

Accordingly, it is an object of the present invention to provide a control installation for controlling the cooling medium temperature to a predetermined desired value in an internal combustion engine which avoids, by simple means, the aforementioned shortcomings and drawbacks encountered in the prior art.

It is another object of the present invention to provide an installation for the control of the cooling medium temperature in internal combustion engines to a predetermined desired value which is simple in construction and reliable in operation while utilizing a constant opening temperature of the valve.

A still further object of the present invention resides in a control installation of the type described above which permits the use of any suitable heat carrier and requires only small amounts thereof to achieve the desired control effect.

A further object of the present invention resides in a control installation for controlling the temperature of the cooling medium in internal combustion engines to a predetermined desired value in which an increase in the desired value takes place only at lower external temperatures and therefore precludes harmful overheating of the engine.

These and other objects, features, and advantages of the present invention will become more obvious from the following description when taken in connection with the accompanying drawing which shows, for purposes of illustration only, one embodiment in accordance with the present invention, and wherein:

The single figure is a schematic view of a cooling medium circulation system of an internal combustion engine provided with a control installation according to the present invention, in which only those details are shown which are significant to the present invention.

Referring now to the drawing, the cooling water is pumped by means of a cooling water pump 10 and by way of a line 11 to the cooling spaces of the internal combustion engine schematically indicated at 12. The cooling water heated by the internal combustion engine 12 may be conducted by way of a feed line 13 to the heat-exchanger 14 for the heat transfer to the atmospheric air. The heat-exchanger 14 is connected by way of a return line 15 to the suction side of the water pump 10.

The feed or input line 13 and the return line 15 are connected with each other by a by-pass line 16 by-passing the heat-exchanger 14. A control valve generally designated by reference numeral 17 is arranged at the discharge of the by-pass line 16 in the feed or input line 13.

The control valve 17 is provided with an axially movable valve disk 18 with which is securely connected the housing 19 of an adjusting cylinder generally designated by reference numeral 20. The housing 19 is filled with a material having a high thermal expansivity. A pin 21 extends through the housing 19 at its securing end and is acted upon in a piston-like manner by the temperature-sensitive material. The pin 21 is securely or rigidly connected with a fixed seating part 22 of the valve 17 so that with a temperature increase of the cooling water in the input or feed line 13, the valve disk 18 is lifted off from the valve seat 23 and the flow to the heat-exchanger 14 is opened up. After reaching a predetermined cooling water temperature, the valve seat 24 in the by-pass line 16 is completely closed by the valve disk 18.

An input or feed line 25 of a conventional heater installation is connected to the input or feed line 13 of the cooling water circulatory system intermediate the internal combustion engine and the by-pass line 16. The heater installation may be intended, for example, for heating the passenger space of a passenger motor vehicle driven by the internal combustion engine 12.

The input or feed line 25 leads to a heat-exchanger 26 which serves for heating the heating air. The heat-exchanger 26 is also connected by way of a return line 27 with the suction side of the cooling water pump 10 or with the return line 15 of the cooling water circulatory system. The housing 19 of the adjusting cylinder is surrounded by a jacket or casing 28 of heat-conducting material.

The annularly shaped space 29 between the housing 19 and the jacket or casing 28 is sealed with respect to the lines 13 and 16 for the cooling water. The jacket or casing 28 is provided with one connection 30 and 31 each for an input or feed line 32 and a return line 33.

The feed line 32 is connected with the return line 15 of the cooling water circulation system in proximity to the heat-exchanger 14 for the cooling water. The return line 33 connects the space 29 of the valve 17 with the suction space of the cooling water pump 10. A valve 34 is provided in the feed line 32 whose movable valve body is connected by an actuating link or adjusting connection indicated schematically by dash and dot line 35 with the movable valve body at a valve 36 arranged in the feed line 25 of the heating installation.

Operation

The operation of the installation described is as follows:
With cooling water temperatures in the feed line 13 below the opening temperature of the valve 17, the cooling water flows through the lines 11, 13, 16 and 15 in the by-pass circulation system. The opening temperature is determined by the chemical composition of the heat-sensitive material in the housing 19. If the feed line 25 of the heating installation is closed by the valve 36, then also the flow in the feed line 32 to the valve 17 is necessarily closed by the valve 34. The water in the space 29 between the casing or jacket 28 and the housing 19 assumes the temperature of the cooling water in the lines 13 and 16. If the temperature increases in these lines to the opening temperature of the valve 17, then the flow in the line 13 to the heat-exchanger 14 is more or less opened up by the valve disk 18 and is more or less throttled in the by-pass line 16.

With a turned-off heater installation, corresponding to the closing position of valves 34 and 36, the control installation thus works in the usual manner.

With a turned-on heater installation corresponding to an open position of the valves 34 and 36, the space 29 about the housing 19 is traversed by the cooled-off cooling water from the return line 15. Consequently, the cooling water of the lines 13 and 16, which flows about the jacket or casing 28, has to reach a considerably higher temperature than with a turned-off heater installation in order to heat the heat-sensitive filling of the adjusting cylinder 20 to the opening temperature of the valve 17. As a result thereof, the temperature of the heating water in the feed line 25 is also increased so that with lower outside temperatures during which the heater valve 36 is opened, a larger heat quantity can be given off to the heating air in the heat-exchanger 26.

In the illustrated embodiment of an installation according to the present invention, the cooling water cooled off by the heat-exchanger 14 from the return line 15 is used as heat carrier for changing the desired value of the cooling water temperature.

However, it is also possible to utilize for this purpose, other substances or materials which do not serve the heating or cooling purpose.

In the illustrated embodiment, the temperature of the water in the line 32 may be matched to different conditions in that a part of the line 32 is displaced into the feed line 13. Also by changing the location of the top for the line 32 in the cooling water circulation system or by tapping the return line 27 of the heating installation by the line 32 such a matching can be achieved.

It is thereby of advantage if the heat carrier in the line 32 is able to assume the prevailing outside temperature or a temperature approaching the same prior to entrance into the valve 17, for example, by appropriate displacement of the line 32 into the outside air. A heating of the cooling water beyond the opening temperature then takes place in the by-pass circulation system of the lines 11, 13, 16 and 15 only with lower external temperatures.

In the illustrated installation the housing 19 of the adjusting cylinder 20 is connected with the valve disk 18 and necessarily participates in the control movements thereof. For that reason, the connections 30 and 31 of the casing or jacket 28 are each connected with the associated line 32 and 33 by movable or yielding connecting pieces 37 and 38, respectively.

I claim:

1. An installation for controlling the cooling medium temperature to a predetermined, desired value in an internal combustion engine whose cooling medium circulatory system includes a heat-exchanger for the heat transfer of the cooling medium, a by-pass line by-passing said heat-exchanger, and valve means selectively controlling the flow through the heat-exchanger and its associated by-pass line and including a movable valve body operatively connected with adjusting means effective to produce an adjusting force in dependence on the cooling medium temperature so that with a cooling medium temperature above the opening temperature of the valve means, the by-pass line is more or less closed and the flow through the associated heat-exchanger is more or less opened up whereas with a cooling medium temperature below the opening temperature, the by-pass line is opened, and the flow through the associated heat-exchanger is blocked, wherein the improvement comprises temperature-sensing means forming part of the adjusting means which is in heat-transferring connection with a space for the cooling medium as well as with an additional space for a heat carrier serving the purpose of changing said desired valve.

2. An installation according to claim 1, further comprising ocntrol means for controlling the flow of the heat carrier for changing the desired value.

3. An installation according to claim 2, wherein the heat-carrier for changing the desired value has a temperature corresponding approximately to the prevailing atmospheric temperature.

4. An installation according to claim 2, wherein the heat-carrier for changing the desired value has the prevailing atmospheric outside temperature.

5. An installation according to claim 2, wherein the additional space of the sensing means is operatively connected with the cooling medium circulatory system.

6. An installation with a heating system having a circulatory system for a heating medium and heater means according to claim 5, wherein the additional space of the sensing means is operatively connected with the circulatory system for the heating medium of the heater means.

7. An installation according to claim 2, wherein a heat carrier exclusively is supplied to the additional space of the sensing means which does not serve for heat-exchange purposes of a heating and cooling system.

8. An installation according to claim 6, wherein the heater means includes valve means for the heating medium thereof, and wherein the control means for controlling the flow of the heat carrier for changing the desired value is operatively connected with the valve means for the heating medium.

9. An installation according to claim 8, wherein said first-mentioned valve means includes an axially movable valve disk which rests under the influence of a spring against the valve seat of a seating part, and an adjusting cylinder whose housing is arranged as said sensing means for the cooling medium temperature in a cooling medium space, said housing being filled with a material of high thermal expansivity and being traversed by a pin acted upon in a piston-like manner by said material, the housing being secured at the end, at which the pin extends out of the same, at one of the two parts consisting of the seating part and of the valve disk, and the pin being secured at the other of said two parts, and a jacket of heat-conducting material surrounding the housing of the adjusting cylinder to form the additional space therebetween which is sealed with respect to the cooling medium space.

10. An installation according to claim 9, wherein the jacket includes connecting means for the supply and discharge of the heat carrier for the purpose of changing the desired value.

11. An installation according to claim 10, wherein the connecting means of said jacket, which is securely connected with the valve disk, are connected with movable line means for the heat carrier for the purpose of changing the desired value.

12. An installation according to claim 1, wherein the heat-carrier for changing the desired value has a temperature corresponding approximately to the prevailing atmospheric temperature.

13. An installation according to claim 1, wherein the heat-carrier for changing the desired value has the prevailing atmospheric outside temperature.

14. An installation according to claim 1, wherein the additional space of the sensing means is operatively connected with the cooling medium circulatory system.

15. An installation with a heating system having a circulatory system for a heating medium and heater means according to claim 1, wherein the additional space of the sensing means is operatively connected with the circulatory system for the heating medium of the heater means.

16. An installation according to claim 1, wherein a heat carrier exclusively is supplied to the additional space of the sensing means which does not serve for heat-exchange purposes of a heating and cooling system.

17. An installation according to claim 1, wherein said first-mentioned valve means includes an axially movable valve disk which rests under the influence of a spring against the valve seat of a seating part, and an adjusting cylinder whose housing is arranged as said sensing means for the cooling medium temperature in a cooling medium space, said housing being filled with a material of high thermal expansivity and being traversed by a pin acted upon in a piston-like manner by said material, the housing being secured at the end, at which the pin extends out of the same, at one of the two parts consisting of the seating part and of the valve disk, and the pin being secured at the other of said two parts, and a jacket of heat-conducting material surrounding the housing of the adjusting cylinder to form the additional space therebetween which is sealed with respect to the cooling medium space.

18. An installation according to claim 17, wherein the jacket includes connecting means for the supply and discharge of the heat carrier for the purpose of changing the desired value.

19. An installation according to claim 18, wherein the connecting means of said jacket, which is securely connected with the valve disk, are connected with movable line means for the heat carrier for the purpose of changing the desired value.

20. An installation for controlling the cooling medium temperature to a predetermined, desired value in an internal combustion engine whose cooling medium circulatory system includes a heat-exchanger for the heat transfer of the cooling medium, a by-pass line by-passing said heat-exchanger, a heater installation operatively connected with the circulatory system for the cooling medium and including heater means using a heating medium, and valve means selectively controlling the flow through the heat-exchanger and its associated by-pass line and including a movable valve body operatively connected with adjusting means effective to produce an adjusting force in dependence on the cooling medium temperature so that with a cooling medium temperature above the opening temperature of the valve means, the by-pass line is more or less closed and the flow through the associated heat-exchanger is more or less opened up whereas with a cooling medium temperature below the opening temperature, the by-pass line is opened, and the flow through the associated heat-exchanger is blocked, wherein the improvement comprises temperature-sensing means forming part of the adjusting means which is in heat-transferring connection with a space for the cooling medium as well as with an additional space for a heat carrier serving the purpose of changing said desired value.

21. An installation according to claim 20, further comprising control means for controlling the flow of the heat carrier for changing the desired value.

22. An installation according to claim 21, wherein the heater means includes valve means for the heating medium thereof, and wherein the control means for controlling the flow of the heat carrier for changing the desired value is operatively connected with the valve means for the heating medium.

23. An installation according to claim 22, wherein said first-mentioned valve means includes an axially movable valve disk which rests under the influence of a spring against the valve seat of a seating part, and an adjusting cylinder whose housing is arranged as said sensing means for the cooling medium temperature in a cooling medium space, said housing being filled with a material of high thermal expansivity and being traversed by a pin acted upon in a piston-like manner by said material, the housing being secured at the end, at which the pin extends out of the same, at one of the two parts consisting of the seating part and of the valve disk, and the pin being secured at the other of said two parts, and a jacket of heat-conducting material surrounding the housing of the adjusting cylinder to form the additional space therebetween which is sealed with respect to the cooling medium space.

24. An installation according to claim 23, wherein the jacket includes connecting means for the supply and discharge of the heat carrier for the purpose of changing the desired value.

25. An installation according to claim 24, wherein the connecting means of said jacket, which is securely connected with the valve disk, are connected with movable line means for the heat carrier for the purpose of changing the desired value.

References Cited

UNITED STATES PATENTS

| | | | |
|---|---|---|---|
| 1,767,598 | 6/1930 | Mallory | 123—41.1 |
| 2,435,041 | 1/1948 | Hild | 123—41.1 |
| 2,677,357 | 5/1954 | Brubaker | 123—41.1 |
| 3,080,857 | 3/1963 | Middendorf | 123—41.1 |
| 3,221,720 | 12/1965 | Dangauthier | 123—41.09 |
| 3,228,381 | 1/1966 | Stefan | 123—41.08 |

AL LAWRENCE SMITH, Primary Examiner